United States Patent [19]

Umeki

[11] Patent Number: 4,494,966
[45] Date of Patent: Jan. 22, 1985

[54] PROCESS FOR NITROGEN ENRICHMENT

[75] Inventor: Masakazu Umeki, Yawata, Japan

[73] Assignee: The BOC Group plc, London, England

[21] Appl. No.: 510,464

[22] Filed: Jul. 1, 1983

[30] Foreign Application Priority Data

Jul. 7, 1982 [JP] Japan .................................. 57-118064

[51] Int. Cl.³ .............................................. B01D 53/04
[52] U.S. Cl. ............................................. 55/26; 55/58; 55/62; 55/68
[58] Field of Search .................... 55/25, 26, 58, 62, 68, 55/75

[56] References Cited

U.S. PATENT DOCUMENTS

| | | | |
|---|---|---|---|
| 3,891,411 | 6/1975 | Meyer | 55/68 X |
| 3,923,477 | 12/1975 | Armond et al. | 55/68 X |
| 4,007,021 | 2/1977 | Gyllinder | 55/62 X |
| 4,153,434 | 5/1979 | Settlemyer | 55/179 X |
| 4,222,750 | 9/1980 | Gauthier et al. | 55/68 X |
| 4,256,469 | 3/1981 | Leitgeb | 55/68 X |
| 4,264,339 | 4/1981 | Juntgen et al. | 55/68 X |
| 4,331,455 | 5/1982 | Sato | 55/62 X |
| 4,348,213 | 9/1982 | Armond | 55/62 X |
| 4,376,639 | 3/1983 | Vo | 55/68 X |
| 4,376,640 | 3/1983 | Vo | 55/68 X |
| 4,415,340 | 11/1983 | Knoblauch et al. | 55/68 X |

Primary Examiner—Robert Spitzer
Attorney, Agent, or Firm—David L. Rae; Larry R. Cassett

[57] ABSTRACT

In a pressure swing adsorption process for the production of nitrogen enriched product gas from air, when the process is halted during a pressure equalization step, that is, with valves open to permit the flow of gas from one vessel to a second vessel, then the gas remaining in the vessels is exhausted to atmosphere by opening a further valve. This results in rapid return to the required purity of nitrogen enriched product gas on start-up of the process. Preferably, subsequent to opening the further valve, another valve is opened, thereby permitting nitrogen-rich product gas from a reservoir to flow through the vessels, thereby purging said vessels with nitrogen enriched product gas.

6 Claims, 3 Drawing Figures

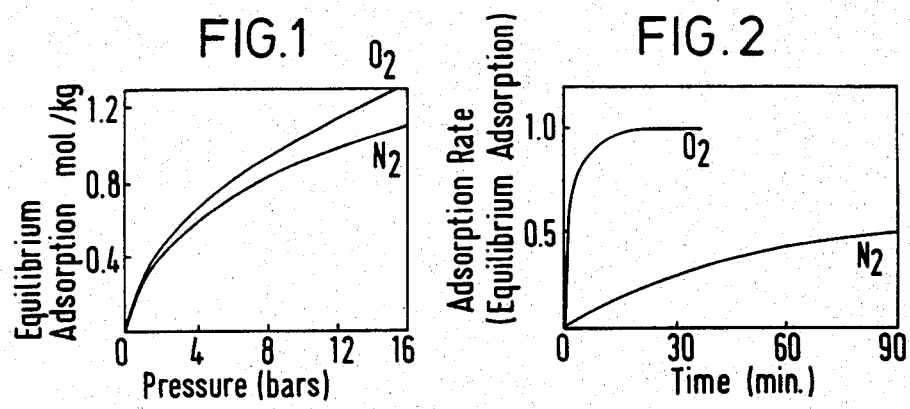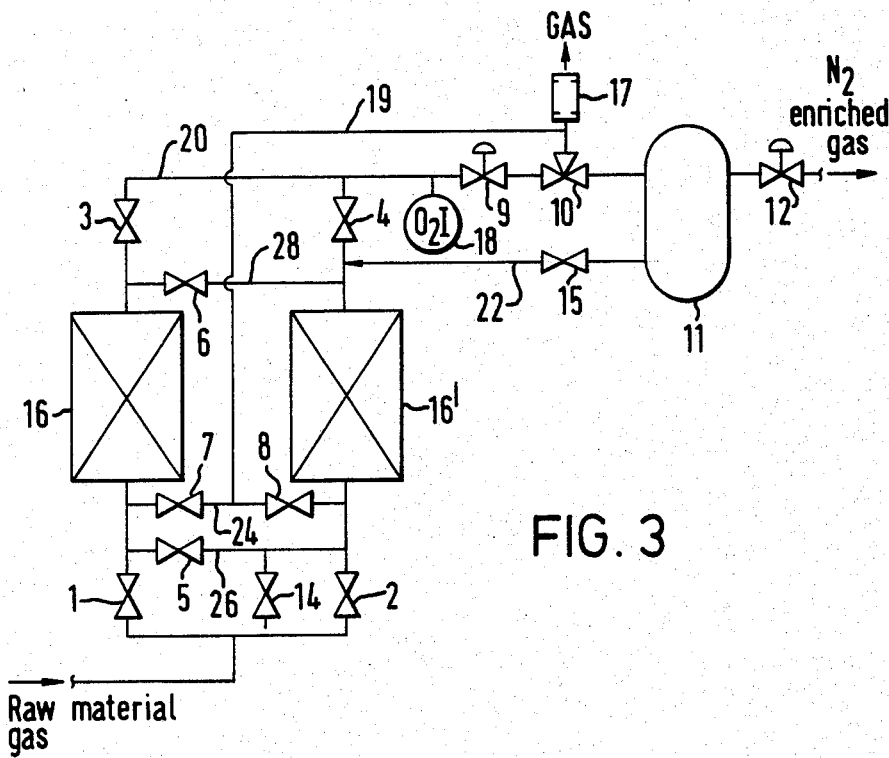

4,494,966

PROCESS FOR NITROGEN ENRICHMENT

BACKGROUND OF THE INVENTION

The present invention relates to processes for the separation of a gaseous mixture and in particular to a process for the production of nitrogen rich gas from air.

Processes are known for the separation of nitrogen from air employing an adsorbent material which has the ability to effect separation as between the two major components of air by virtue of its more rapid adsorption of oxygen that nitrogen. The adsorbent is typically molecular sieve carbon, for example, as described in Japanese patent publication (Kokoku) No. 18675/1977.

In operation, a bed of the adsorbent is put through a cycle of operations which includes an adsorbent step during which time air is passed through the bed and most of the oxygen and a proportion of the nitrogen and substantially all the carbon dioxide and water vapour in the feed are adsorbed, and a nitrogen-rich product gas is supplied from the outlet of the bed; and a desorption step during which time the outlet of the bed is closed, the bed is vented to atmospheric pressure through its inlet and/or evacuated through its inlet so that the adsorbed gases are substantially removed from the bed, thereby preparing it for the next adsorption step.

In practice, two adsorbent beds are employed and operate on similar cycles which are sequenced to be out of phase with one another by 180° so that when one bed is on during its adsorption step, the other bed is on its desorption step and vice-versa.

However, although the known nitrogen producing systems are satisfactory for the the supply of product gas on a continuous basis, should they have to be closed down, then after a fresh start-up a considerable time is required before the product gas reaches an acceptable purity. Normally, the process is halted (closed down) during a pressure equalisation step to make a fresh start-up easier. However, if the apparatus is allowed to stand for a long time, it has been found that oxygen which was originally adsorbed by the molecular sieve carbon is desorbed and on start-up the oxygen dilutes the nitrogen product gas. As a result, the time after start-up before an acceptable purity of product gas can be supplied is prolonged. This can necessitate the discharge of enriched nitrogen of insufficient purity from the apparatus prior to an acceptable level of purity being obtained. Thus, when the known nitrogen producing systems are used on an intermittent basis, their operating efficiency is low.

SUMMARY OF THE INVENTION

It is an aim of the present invention to provide a process for the separation of a gas mixture to provide a product gas which when closed down and then restarted very quickly produces product gas of an acceptable purity.

In particular, it is an aim of the present invention to provide a process for the supply of nitrogen-rich gas from air which when closed down and then restarted very quickly produces nitrogen-rich product gas of an acceptable purity.

According to the present invention, a process for the separation of a gas mixture comprises the steps of:
(a) repeatedly performing a cycle of operations in employing a first vessel containing adsorbent which absorbs one component of a gas mixture more readily than another or the other component of the gas mixture, the cycle of operations comprising:
  (i) passing the gaseous mixture under pressure through the vessel whereby said one component is adsorbed and a gas stream relatively lean in the adsorbed component flows out of the bed as a product gas;
  (ii) regenerating the adsorbent by desorbing gas therefrom and causing a gas stream relatively rich in the desorbed gas to flow out of the vessel;
(b) repeatedly performing such a cycle of operations employing a second vessel containing said adsorbent, the cycles being phase relative to one another such that at no time is step (i) or step (ii) in one cycle performed simultaneously with the corresponding step in the other cycle;
(c) passing the product gas stream into a reservoir; and
(d) at intervals between successive adsorption steps the two beds are placed in flow communication with each other;

wherein when the process is halted during the intervals between successive adsorption steps when the two beds are placed in flow communication, then any gas remaining in the vessels is exhausted from the said vessels countercurrently to the flow of product gas thereby to depressurise the vessels.

Preferably, subsequent to depressurisation of the vessels, the vessels are purged with product gas.

BRIEF DESCRIPTION OF DRAWINGS

An embodiment of the invention will now be described by way of example, reference being made to the Figures of the accompanying diagrammatic drawings in which:

FIG. 1 is a graph showing isothermic equilibrium adsorption of nitrogen and oxygen by molecular sieve carbon;

FIG. 2 is a graph showing the adsorption rate of oxygen and nitrogen by molecular sieve carbon; and FIG. 3 is a diagrammatic flow sheet of an apparatus for the separation of a gas mixture.

DESCRIPTION OF PREFERRED EMBODIMENT

Referring first to FIG. 3, a nitrogen producing apparatus includes a raw material gas (air) feed pipe extending to inlet valves, 1, 2. Valve 1 controls the flow of air to a first vessel 16 containing beds of molecular sieve carbon whilst valve 2 controls the flow of air to a second vessel 16' also containing beds of molecular sieve carbon. The molecular sieve carbon has an isothermal equilibrium adsorption to oxygen and nitrogen as shown in FIG. 1.

Valve 3 controls the flow of nitrogen-rich product gas leaving vessel 16 whilst valve 4 controls the flow of nitrogen-rich product gas leaving vessel 16'. The outlets from valves 3, 4 are joined to a product gas outlet pipe 20 in which are positioned valves 9 and 10. Also connected to the pipe 20 is an analyser 18 for measuring any oxygen present in the product gas. The pipe 20 terminates at a reservoir 11. The flow of product gas from reservoir 11 to the outlet fom the apparatus is controlled by an adjustable valve 12. A pipe 22 extends from reservoir 11 to the outlet of vessel 16' between the vessel 16' and valve 4. The pipe 22 includes a valve 15.

A first pipe 24 extends between the inlets to vessel 16, 16' and includes two valves 7, 8. A pipe 9 communicates with pipe 24 intermediate said valve 7, 8 and extends to atmosphere via a silencer 17.

A second pipe 26 extends between the inlets to vessel 16, 16' and include a valve 5. An exhaust pipe extends from said second pipe 26 and includes a valve 14. A pipe 28 extends between the outlets of the vessels 16, 16' and includes a valve 6.

TABLE 1

| Valve | (underline shows that the valve is opened) Time → |
|---|---|
| 1 | _Absorption_ |
| 2 | _Absorption_ |
| 3 | _____ |
| 4 | _____ |
| 5 | P.E.*   P.E.* |
| 6 | P.E.*   P.E.* |
| 7 | _Depressurisation_ |
| 8 | _Depressurisation_ |

Note:
*is pressure equalisation

As shown with reference to table 1, a two step cycle is repeatedly performed by each vessel 16, 16'. The two steps are called herein "adsorption" and "desorption". These steps are typically performed at the same temperature as one another. The adsorption and desorption steps are all of equal time and phased such that whenever one of the beds is performing an adsorption step the other is being regenerated or desorbed.

Moreover, there is an interval between one pair of adsorption and desorption steps and the next pair of adsorption and desorption steps. Throughout this interval the two beds are placed in communication with one another by opening the valves 5 and 6 to perform what is referred to herein as a pressure equalisation step.

Assuming that vessel 16 is in its adsorption step, then raw material gas such as air passes through air feed pipe under pressure and hence through valve 1 which is open and into the vessel 16, where oxygen is adsorbed preferentially by the beds of molecular sieve carbon within vessel 16. Normally, the pressure in the vessel 16 during the adsorption step is in the range of 1 to 10 kg/cm²g and preferably within the range 2 to 9 kg/cm²g. Nitrogen rich product gas then leaves vessel 16 and passes through valve 3 which is open and through valves 9 and 10 and into reservoir 11.

As shown in table 2, this adsorption step usually takes approximately 56 seconds.

TABLE 2

| Cycle time (second) | Absorption zone | |
|---|---|---|
| | Bed 16' | Bed 16 |
| 0 to 4 | pressurisation by pressure equalisation | depressurisation by pressure equalisation |
| 4 to 60 | pressurisation by raw material gas and adsorption | depressurisation to one atmospheric pressure |
| 60 to 64 | depressurisation by pressure equalisation | pressurisation by pressure pressure equalisation |
| 64 to 120 | depressurisation to one atmospheric pressure | pressurisation by raw material gas and adsorption |

After a predetermined interval, valves 1 and 3 are closed and valves 5 and 6 are opened so that the two vessels 16, 16' are in communication at their inlets and outlets and gas will flow from vessel 16 to vessel 16'. This equalisation step usually takes from 1.5 to 5 seconds.

Whilst the vessel 16 was in the adsorption mode, the vessel 16' was in its desorption mode. Valve 8 was open, allowing oxygen rich waste gas to pass countercurrent through vessel 16' and along pipe 19 and through silencer 17 to atmosphere. The pressure in vessel 16 can be reduced to atmospheric pressure by passing the waste gas directly out to atmosphere as shown. Alternatively, a vacuum pump can be incorporated to reduce the pressure in vessel 16 to sub-atmospheric pressure, usually between 60 to 300 torr.

As explained previously, the three steps of adsorption, pressure equalisation and desorption are repeated continuously for each bed at 180° out of phase whilst the apparatus is in operation. Nitrogen rich product gas can be withdrawn from reservoir 11 by opening valve 12 at any time during the cycle of operations.

When the apparatus is closed down during a pressure equalisation step and is allowed to stand for a long time, the oxygen and nitrogen remaining in the adsorption vessel come to equilibrium with the molecular sieve carbon according to the relationship shown in FIG. 1. As a result, the oxygen which was initially adsorbed becomes desorbed and the composition percentage oxygen in the gas phase exceeds that found throughout the vessel at the end of a 1.5 to 5 second equalisation.

As explained with reference to the prior art, when it is desired to shut down the apparatus, this is done during a pressure equalisation step and valves 1, 2, 3, 4, 7 and 8 are closed but valves 5 and 6 remain open. Thereafter, according to the present invention, valve 14 is opened and gas remaining in vessels 16, 16' is exhausted to atmosphere. Subsequently, valve 15 is opened permitting some of the nitrogen-rich product gas from the reservoir 11 to pass through vessels 16, 16' to purge the vessels with nitrogen-rich product gas. Finally, valves 14, 15 are closed.

The valve 9 is used for adjusting adsorption pressure in the vessels 16, 16' whilst valve 10 is a two-way valve which leads product gas into the reservoir 11 when the percentage oxygen specification is correct but diverts it to waste when the percentage oxygen specification is incorrect.

Table 3 shows the preferable time sequence of the apparatus in which a vacuum step is carried out.

TABLE 3

| Cycle time | Absorption zone | |
|---|---|---|
| | Bed 16' | Bed 16 |
| 0 to 4 | pressurisation by pressure equalisation | depressurisation by pressure equalisation |
| 4 to 9 | pressurisation by raw material gas and adsorption | depressurisation to one atmospheric pressure |
| 9 to 60 | pressurisation by raw material gas and adsorption | evacuation |
| 60 to 64 | depressurisation by pressure equalisation | pressurization by pressure equalisation |
| 64 to 69 | depressurisation to one atmospheric pressure | pressurisation by raw material gas and adsorption |
| 69 to 120 | evacuation | pressurisation by raw material gas and adsorption |

EXAMPLES 1 AND 2 AND CONTROL TESTS 1 AND 2

Air was used as a raw material gas. The adsorption conditions are as follows:

Absorption pressure—7 kg/cm$^2$g
Pressure of the zone at the time when the pressure equalisation had been completed—3.5 kg/cm$^2$g
Pressure of the zone at the time the depressurising step had been completed—0 kg/cm$^2$g Control tests 1 and 2 relate to the prior art process. Examples 1 and 2 relate to the present process. The results are shown in table 4.

TABLE 4

| Example & control test | Operation method | Time necessary for attaining nitrogen gas of 99.5% by volume (minutes) |
|---|---|---|
| Control test 1 | When the apparatus was re-started after 2 hour halt | 30 |
| Control test 2 | When the apparatus was re-started after 29 hour halt | 50 |
| Example 1 | When the gas remaining in the zone was discharged after halt of the apparatus and the apparatus was allowed to stand for 21 hours | 7 |
| Example 2 | When the gas remaining in the zone was discharged and part of the nitrogen enriched product was passed through the zone after halt of the apparatus and the apparatus was allowed to stand for 22 hours | 0 |

It was apparent from Control tests 1 and 2 that the time necessary for attaining the permissible oxygen level in the nitrogen enriched gas became prolonged as the halt time became longer. In Examples 1 and 2 according to the present invention, the time necessary for attaining the permissible oxygen level was significantly shortened.

I claim:

1. A process for the separation of a gas mixture comprising the steps of:
    (a) repeatedly performing a cycle of operations in employing a first vessel containing adsorbent which adsorbs one component of a gas mixture more readily than another or the other component of the gas mixture, the cycle of operations comprising:
        (i) passing the gaseous mixture under pressure through the vessel whereby said one component is adsorbed and a gas stream relatively lean in the adsorbed component flows out of the bed as a product gas;
        (ii) regenerating the adsorbent by desorbing gas therefrom and causing a gas stream relatively rich in the desorbed gas to flow out of the vessel;
    (b) repeatedly performing such a cycle of operations employing a second vessel containing said adsorbent, the cycles being phase relative to one another such that at no time is step (i) or step (ii) in one cycle performed simultaneously with the corresponding step in the other cycle;
    (c) passing the product gas stream into a reservoir;
    (d) placing the two beds in flow communication with each other at intervals between successive adsorption steps;
    (e) halting the process during an interval between successive adsorption steps when the two beds are placed in flow communication, exhausting gas remaining in the vessels from the said vessels countercurrently to the flow of the gas mixture to thereby depressurize the vessels; and
    (f) purging the depressurized vessels by passing product gas from said reservoir to said vessels.

2. A process as claimed in claim 1, in which the gas mixture is air and the product gas is nitrogen enriched gas.

3. A process as claimed in claim 2, in which the nitrogen enriched product gas used for purging the vessels is in the range of 3 to 10% on the basis of nitrogen enriched product by the adsorption step.

4. A process as claimed in claim 1, in which the pressure within the vessels during adsorption is in the range of 1 to 10 kg/cm$^2$g.

5. A process as claimed in claim 4, in which the pressure within the vessels during adsorption is in the range of 2 to 9 kg/cm$^2$g.

6. A process as claimed in claim 1, in which during the desorption step each vessel is subject to a vacuum to reduce the pressure within the vessel to below atmospheric pressure.

* * * * *